United States Patent
Mahalingam et al.

(10) Patent No.: US 6,775,673 B2
(45) Date of Patent: Aug. 10, 2004

(54) LOGICAL VOLUME-LEVEL MIGRATION IN A PARTITION-BASED DISTRIBUTED FILE SYSTEM

(75) Inventors: Mallik Mahalingam, Sunnyvale, CA (US); Zheng Zhang, San Jose, CA (US); Christos Karamanolis, Sunnyvale, CA (US); Daniel A. Muntz, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 464 days.

(21) Appl. No.: 10/024,941

(22) Filed: Dec. 19, 2001

(65) Prior Publication Data

US 2003/0115434 A1 Jun. 19, 2003

(51) Int. Cl.[7] ............................................... G06F 17/30
(52) U.S. Cl. .......................................... 707/10; 707/205
(58) Field of Search .............................. 707/4, 10, 100, 707/102, 103 R, 104.1, 205; 709/203, 234, 235, 238, 245, 248; 710/74; 715/500.1; 717/102, 109; 711/120

(56) References Cited

U.S. PATENT DOCUMENTS

| | | | | |
|---|---|---|---|---|
| 5,608,903 A | * | 3/1997 | Prasad et al. | 707/10 |
| 5,758,344 A | * | 5/1998 | Prasad et al. | 707/10 |
| 5,956,718 A | * | 9/1999 | Prasad et al. | 707/10 |
| 6,047,289 A | * | 4/2000 | Thorne et al. | 707/10 |
| 6,438,652 B1 | * | 8/2002 | Jordan et al. | 711/120 |
| 6,687,701 B2 | * | 2/2004 | Karamanolis et al. | 707/10 |

* cited by examiner

*Primary Examiner*—Diane D. Mizrahi
*Assistant Examiner*—Apu M Mofiz

(57) ABSTRACT

Method and system for migrating a logical volumes in a distributed file system having multiple partitions servers. Each partition server owns one or more volumes, and each volume including a subset of logically related objects of the file system. In response to a migration request that requests migration of a selected logical volume from a source partition server to the target partition server, an ownership map is updated to indicate the selected logical volume is owned by the target partition server. At the source partition server, forwarding information is stored to reference the target partition server. When the source partition server receives a request for access to the object, the forwarding information is transmitted to the requester.

17 Claims, 6 Drawing Sheets

LOGICAL VOLUME-LEVEL MIGRATION IN A PARTITION-BASED DISTRIBUTED FILE SYSTEM

RELATED APPLICATIONS/PATENTS

This application/patent is related to the following applications/patents:

"OBJECT-LEVEL MIGRATION IN A PARTITION-BASED DISTRIBUTED FILE SYSTEM," by Mahalingam et al., filed on the same date as this application/patent, and having U.S. patent application Ser. No. 10/024937, now pending; and "UPDATING REFERENCES TO A MIGRATED OBJECT IN A PARTITION-BASED DISTRIBUTED FILE SYSTEM," by Mahalingam et al., filed on the same date as this application/patent, and having U.S. patent application Ser. No. 10/20494, now pending.

FIELD OF THE INVENTION

The present invention generally relates to distributed file systems, and more particularly to object management in distributed file systems.

BACKGROUND

In a distributed file system the data are distributed between network-connected nodes. Distributed file systems are scaleable to satisfy increasing storage and access requirements. As more storage resources are required to satisfy the requirements of various applications, new nodes with additional storage capacity can be added to the distributed file system.

The structuring of data between different nodes may impact the performance of certain applications, depending on data access patterns. For example, if one node provides access to two data sets, heavy access to the two data sets may impact the required performance level. To alleviate this type of performance bottleneck, contention for the storage resources is reduced by redistributing selected data sets amongst the different nodes.

Data are traditionally migrated at the block level, with no movement of the associated control data. Such control data includes, for example a file system directory entry, which is sometimes referred to as "meta-data". If the control data associated with the competing data sets are not separated, the performance level may continue to be negatively impacted. Because referencing data at the block level does not indicate whether the block contains data or meta-data, it is not feasible to migrate meta-data and data blocks together.

Another approach to redistributing data is to move data at the granularity of a file system. This results in both control data and block-level data being moved. However, a file system typically includes many files that are hierarchically organized within many different directories. Thus, moving an entire file system may not separate the data sets that need to be separated. It can be seen with present systems that the granularity of moving data at the block level may be too fine, and the granularity of moving data at the file system level may be too coarse.

Migrating objects in a distributed file system also presents issues for the clients that reference the objects. One issue is the validity of cached file handles after objects have been migrated. Generally, the file handle identifies the host node and other information for referencing a file. The file handle is provided by a namespace server to a client in response to an access request, and the client caches the file handle for future references. If the data referenced by the file handle is moved, the cached file handle will be invalid. Thus, cached file handle must be revalidated for it to be useful to the client.

A system and method that address the aforementioned problems, as well as other related problems, are therefore desirable.

SUMMARY OF THE INVENTION

In various embodiments, the invention provides migration of a logical volumes in a distributed file system having multiple partitions servers. Each partition server owns one or more volumes, and each volume including a subset of logically related objects of the file system. In response to a migration request that requests migration of a selected logical volume from a source partition server to the target partition server, an ownership map is updated to indicate the selected logical volume is owned by the target partition server. At the source partition server, forwarding information is stored to reference the target partition server. When the source partition server receives a request for access to the object, the forwarding information is transmitted to the requester.

Various example embodiments are set forth in the Detailed Description and claims which follow.

BRIEF DESCRIPTION OF THE DRAWINGS

Various aspects and advantages of the invention will become apparent upon review of the following detailed description and upon reference to the drawings in which.

DETAILED DESCRIPTION

In various embodiments, the invention supports migration of objects and associated control structures in a distributed file system, revalidation of cached file handles, and migration of logical volumes of objects. The data objects in a distributed file system are organized into logical volumes, which are owned by partition servers. When selected objects are migrated from a first partition server to a second partition server, forwarding information is maintained at the first partition server. This permits clients that have cached file handles that reference the migrated objects in the first partition server to be directed to the objects in the second partition server. In one embodiment, the cached file handles are revalidated by reporting the forwarding information to clients as requests are made. When a logical volume is migrated, the objects associated with the logical volume are reassigned to a different partition server but are not copied. As with the object-level migration, forwarding information is installed at the partition server from which the logical volume was migrated.

Figure 1:
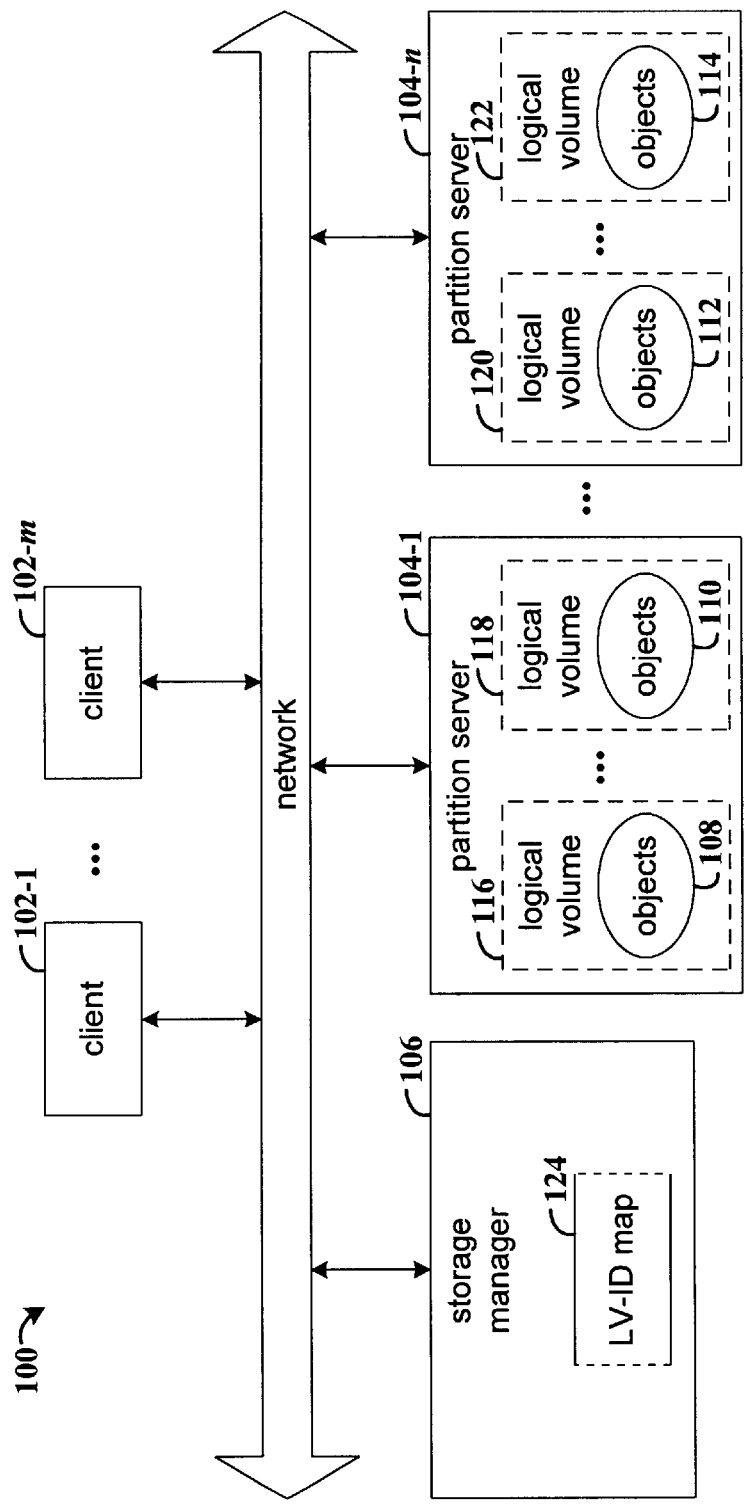
FIG. 1 is a functional block diagram of a data processing arrangement that hosts a distributed file system.

FIG. 1 is a functional block diagram of a data processing arrangement that hosts a distributed file system. Arrangement 100 includes one or more client systems 102-1-102-102-$m$ that access file data that are hosted by one or more partition servers 104-1–104-$n$. Storage manager 106 tracks the storage locations of the file data in the distributed file system. The clients, partition servers, and storage manager are intercoupled by a data communications network 107.

The distributed file system includes sets of objects 108, 110, 112, and 114 that are distributed over multiple physical data processing systems. Logical volumes 116, 118, 120, and 122 are sets of logically related objects in which each set of objects may be stored in multiple storage devices, for example, multiple disks. Each of partition servers 104-1 . . . 104-$n$ "owns" one or more logical volumes. Objects 108, 110, 112, and 114 represent the collection of data and control structures that are associated with different files. By owning a logical volume, the owner partition server control access to objects in the volume, and all access requests flow through the partition server.

Storage manager 106 maintains the logical volume-identifiers (LV-IDs) and the corresponding partition server identifiers in LV-ID map 124. The LV-ID map provides clients with location information of the partition servers that own the logical volumes in the file system. When a partition server initiates contact within the distributed file system, it requests from the storage manger a list of logical volumes that the partition server is responsible for and optionally requests that the storage manager assign one or more volumes to the partition server. The storage manager updates LV-ID to reflect new assignments. In one embodiment, storage manager implements LV-ID map 124 as a distributed database server and each partition server identifier is a network address such as an IP address.

In another embodiment, each partition server maintains an ownership table (not shown) having the LV-IDs of all the volumes the partition server owns. The ownership table is assigned a version number, and each time the contents change the version number is incremented. Upon delivery of an access request for an object, the table is consulted to check whether the partition server owns the corresponding volume. Each partition server obtains the ownership tables of other partition servers as a side effect of cross-partition transactions in the system. The ownership tables of other partition servers are locally cached and constitute neighborhood information. The cached tables are loosely synchronized with the corresponding master copies present on the owner partition servers. The local copies of neighbors' tables are consulted when, for example, the partition server receives a request for an object that is not owned by the partition server. In addition to the file handle, the client is also provided with an identifier for a candidate partition server to be contacted for the object. This information is cached on the client and is used when the object is accessed. The identified partition server is a "candidate" because the requested volume may not be owned by the candidate partition server.

The logical object name is what a user sees in reference to objects in the namespace hierarchy. An example logical object name is "/home/abc." To get to the file abc, the system performs a lookup operation for each subcomponent. In particular, a lookup operation is performed for home. Using the previous portion of the lookup result, a lookup operation is performed for abc. To perform a lookup operation on abc, a valid file handle that identifies /home is required because the namespace data of abc is contained within object /home.

Each of client systems 102-1–102-$m$, partition servers 104-1–104-$m$, and storage manager 106 is implemented on a conventional computing platform in an example embodiment.

Figure 2:
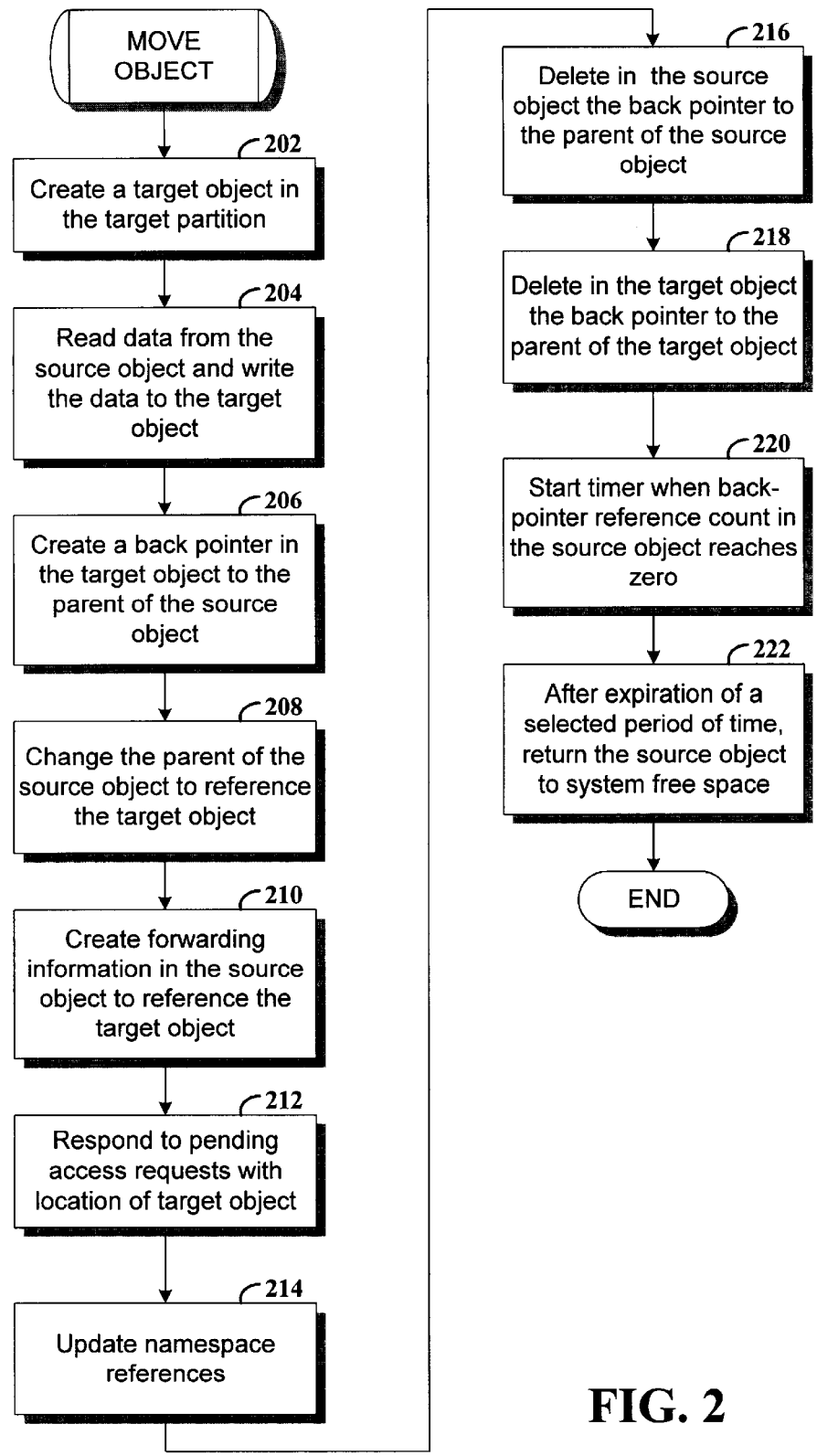
FIG. 2 is a flowchart of an example process for moving an object from one partition server to another partition server.

FIG. 2 is a flowchart of an example process for moving an object from one partition server to another partition server. It is a common administrative task to redistribute file system objects in order to alleviate hot spots, improve system responsiveness, or move the objects closer to the end user, for example. In one embodiment, the protocol for moving selected objects entails, in response to a request initiated at the storage manager, installing forwarding information at the source of the move so that clients with cached file handles are directed to the target of the move when reference is made to the objects at the source.

Steps 202, 204, 206, and 208 are referred to as a "first phase" or "phase 1" and generally entail creating a consistent replica of a source object (the object to be migrated) while requests for access to the object are held. In phase 2 (step 210), forwarding information is created in association with the source object. In phase 3 (step 212), responses are generated for the held access requests to indicate that the object has migrated. Namespace references to the migrated object are updated in phase 4 (step 214), and the source object and forwarding information are returned to available storage in phase 5 (step 222). The following paragraphs describe in greater detail the steps involved in the migration process.

A target object is created in a target partition in response to a request to move an object (step 202). "Target" refers to the destination partition server to which a selected object is to be moved. The target object is created under a target parent object, and a back pointer in the target object is set to reference the target parent object. Each object has a set of back pointers that reference the parent object(s) that reference the object. In one embodiment, a back pointer is a shadow object of the object being migrated. The source partition holds further access requests while creating the replica of the source object. In another embodiment, read requests are allowed to proceed.

After the target object is created, the data of the source object is read and then written to the target object (step 204). The target object is then linked via a back pointer to the parent of the source object (step 206). The back pointer contains, for example, the volume identifier of the parent and the inode number. The metadata at the parent object for the source object is then updated to reference the target object (step 208). Forwarding information is established (step 210) so that client access requests that arrive at the source object can be redirected to the new target object. An example scenario in which this may occur is where the clients cache file handles. Until a cached file handle is revalidated (after objects associated with the file are moved), use of the cached file handle in processing a file access request results in the request being directed to the source object. In one embodiment the forwarding information is stored in the inode of the source object. The forwarding information includes, for example, the logical volume identifier and inode number of the target object.

Pending access requests to the source object are processed by returning a reply message that indicates that the source object has moved and the location of the target object (step 212). Upon receiving the reply message, the clients update the respective cached file handles.

Figures 4, 5:
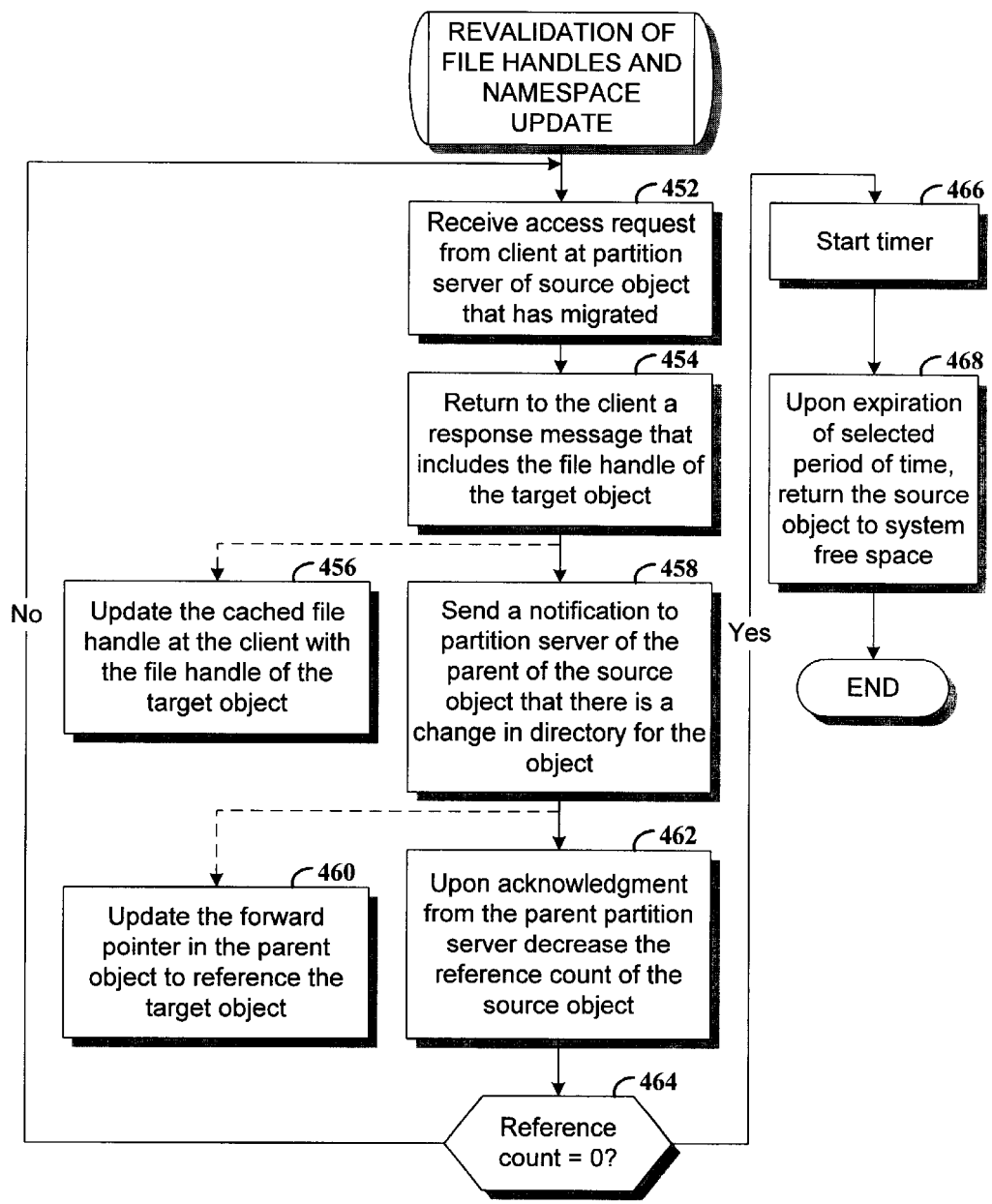
FIG. 4 illustrates an example file handle.
FIG. 5 is a flowchart of an example process for revalidating cached file handles and updating namespace references for an object that has been migrated.

At this stage of the object migration the target object is a consistent replica of the source object, and namespace references must eventually be made to reference the target object. Namespace references are, for example, directories, that include the named object as a child. In one embodiment, which is referred to as "aggressive update," the namespace updates are performed after a consistent target object has been created and the forwarding information has been established (step 210). In another embodiment, which is referred to as "non-aggressive update," the namespace references are gradually updated as requests are made to the source object (FIG. 5). In the aggressive update method (step 214), update requests are sent from the source partition server to all objects that reference the source object. The update requests indicate that the object references need to be updated to reference the target object instead of the source object. The objects that reference the migrated object are identified by the associated back pointer object(s).

After the forwarding information is created, the back pointer to the parent object (as specified in the file handle) in the source object is deleted (step 216). In addition, a reference count in the source object is decremented. The reference count indicates the number of other objects that reference the object (e.g. hard links). The back pointer to the target parent object in the target object is then deleted (step 218).

When the reference count in the source object reaches zero, a timer is started (step 220). The timer is used to limit the duration for which the forwarding information is maintained in the source object. The duration of the timer is a selected period, t. This approach assumes that clients that cache file handles will periodically revalidate cached file handles with t as the period. After the timer expires for the source object, the source object is returned to the file system free space (step 222).

An intention log file is used to support fault tolerance in the object migration process. At the beginning of each phase in an object migration a begin-phase entry is written to the log file, and at the end of each phase an end-phase entry is written. When the migration process is complete, the log entries associated with the migration are removed from the log file. If the source partition server fails during migration, the entries in the intention log file determine the appropriate recovery actions. The appropriate recovery actions also depend on whether the partition server has implemented aggressive or non-aggressive update of namespace references. Recovery scenarios for an aggressive-update implementation are described first, followed by a description of recovery scenarios for a nonaggressive-update implementation.

If object migration fails in phase 1, the source object is still intact and no inconsistencies have been introduced into the namespace having references the source object. In this scenario, the changes are undone by deleting the possibly incomplete target object.

If a failure occurs between phases 1 and 2, either the target object can be removed or the migration process can continue beginning at phase 2, depending on implementation requirements.

If phase 1 completed successfully, but a request was sent (e.g., either from a client, a server, or a storage management agent) to create forwarding information (phase 2) and the acknowledgment was not returned, the source object is probably inconsistent but the target object is available. In recovery from the failed migration, phase 2 is repeated until an acknowledgment is received from the source partition server.

If phase 2 completed successfully, and a failure occurred before continuing with phase 4, the source object is unavailable but contains forwarding information. Because the target object is available, the recovery process commences with phase 4 to relink the namespace to the target object.

If phase 2 completed successfully, and a failure occurred during phase 4, the recovery process performs phase 4 for all objects in the namespace that reference the target object.

For all the recovery scenarios, steps 220 and 220 of the migration process are repeated.

For all recovery scenarios in the non-aggressive-update implementation of the object migration process, the recovery process performs phases 1 through 3 until the migration is complete, even as the system continues to service other requests. Because initiation and completion of the namespace update process (phase 4) is logged to the intention log file, the recovery process can be rescheduled even when the hosting partition server fails.

Figure 3A:
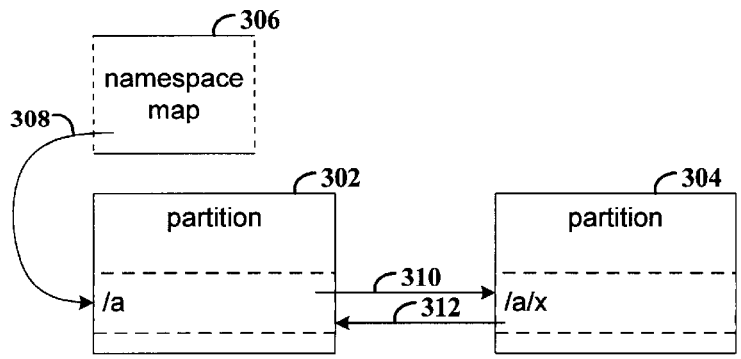
FIGS. 3A, 3B, 3C, and 3D are block diagrams that illustrate the migration of an object from one partition server to another partition server.

FIGS. 3A, 3B, 3C, and 3D are block diagrams that illustrate the migration of an object from one partition server to another partition server. FIG. 3A illustrates an initial state of a distributed file system in which partition 302 stores parent object /a and partition 304 stores source object /a/x. Namespace map 306, implemented on one or more namespace servers, for example, maps object names to the logical locations (volume identifiers and identifier within that volume such as inode), for example /a is mapped to a logical volume "owned" by partition 302 as illustrated with line 308. Line 310 represents a forward pointer that links parent object/a to object /a/x, and line 312 is the back pointer that links object /a/x to the source parent object /a.

Figure 3B:
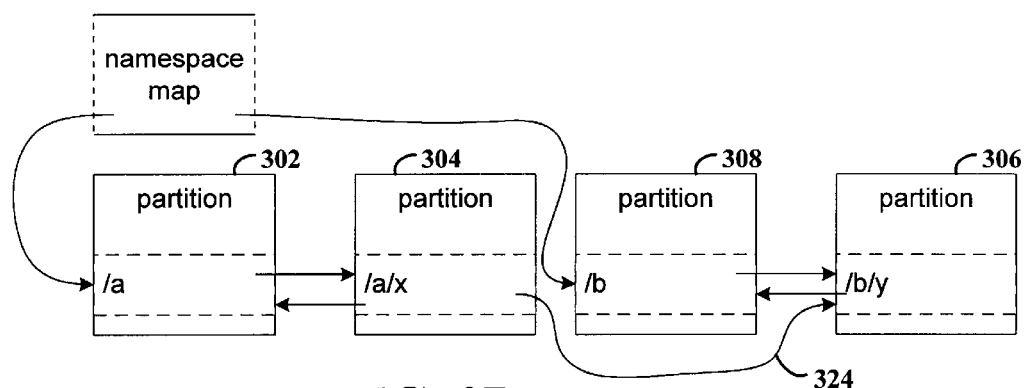

In the example scenario, a group of objects is selected for migration to a different partition, with object /a/x being one of the objects. The process may be initiated at the storage manager 106 via a primitive copy command, for example. The process can also be initiated by a partition server. FIG. 3B illustrates a first phase of the migration process relative to object /a/x. The selected target partition is partition 306. The target object /b/y is created in partition 306, and the target parent object/b is stored in partition 308. A forward pointer 320 is created from the target parent object /b to the target object /b/y, and a back pointer 322 is created from the target object /b/y to the parent object/b. After the data is copied from /a/x to /b/y, the forwarding information is stored in /a/x to reference /b/y (line 324). Even though the target object is referenced here as /b/y, it will be appreciated that from the user's perspective, the logical name of the object remains /a/x after the object has migrated.

Figure 3C:
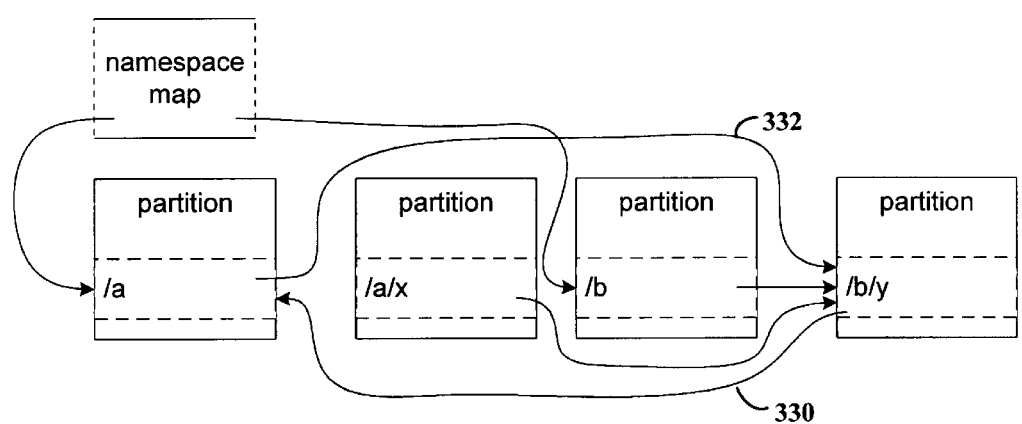

FIG. 3C illustrates the relinking of /a/x and /b/y. The back pointer in /b/y is changed to reference the source parent object /a (line 330), and a forward pointer in /a is changed from referencing /a/x to referencing /b/y (line 332). The back pointer from /a/x to /a (line 312 in FIG. 3A) is deleted as is the back pointer from /b/y to /b (line 322 in FIG. 3B).

Figure 3D:
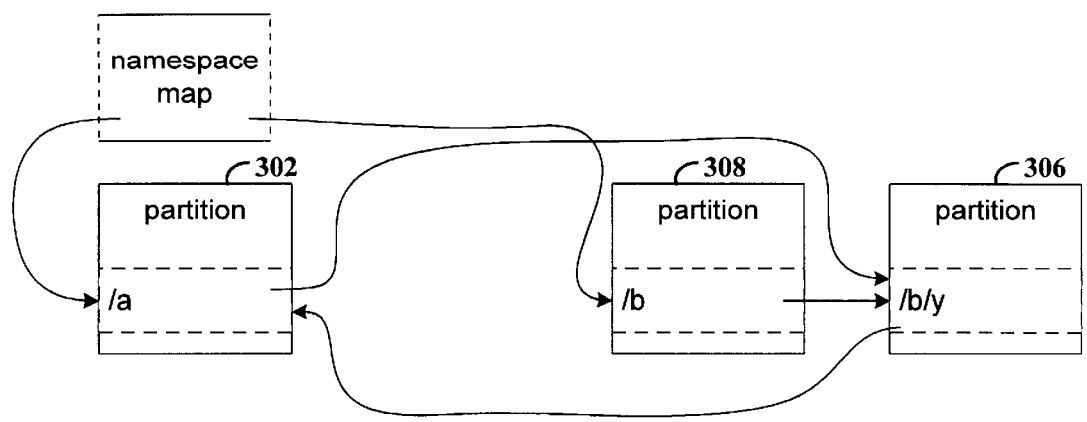

FIG. 3D illustrates links between the migrated object /b/y and the parent source and target objects/a and/b after the object /a/x has been removed. The object /a/x is removed after passage of the time period t for revalidating file handles, which commences when the reference count in /a/x reaches zero.

When a client seeks access to a file in a distributed file system, a lookup operation is performed with a namespace server (not shown) to obtain a file handle that includes information for referencing the file on the appropriate partition server 104-1–104-n. File handles are cached by a layer of file access software on the client systems and are generally opaque to client application software.

FIG. 4 illustrates an example file handle 400. The information in a file handle for an object is stored in the directory of the object and includes, for example, the inode number of the parent directory, LV-ID of the parent directory, inode number of the object, the LV-ID of the object, and a generation number of the inode of the object. In other embodiments, the file handle may include additional information such as attributes of the object.

The LV-ID identifies the logical volume on which the object is stored, and the LV-ID of the parent directory identifies the logical volume on which the parent directory object is stored. The generation number in a file handle uniquely identifies the file handle both between currently active file handles and between file handles that have been deleted for use with one object and later reused with another object.

A directory in a file system is a list of entries, each one containing a reference to an object (file or directory) in the system. A directory entry includes, for example, the inode number (inode#) and name of the referenced object. In an example distributed file system, files and directories may reside in any partition, thus requiring cross-partition references. The inode# field in the directory entry is augmented with the ID of the logical volume where the referenced object resides. The latter requires extensions to the directory entry structure.

Typically, when a client needs to access a file or a directory, a lookup operation is performed first. The result of the lookup is a file handle that is used by the client to perform future accesses. The role of a file handle is to provide a way to identify the object at the server end and is opaque to the client. The file handles are often cached at the clients for performance reasons. A "lookup" operation, for example, a lookup for file "/etc/passwd" is performed in three stages: (1) retrieve the file handle for the root inode—this information is typically stored on every partition server; (2) read the contents of directory "/" and construct the file handle for directory "etc"; and (3) read the contents of "etc" and construct the file handle for file "passwd".

Two issues that are addressed when an object migration process is initiated and completed are ensuring the validity of cached file handles that reference migrated objects and updating namespace references to point to the new object. FIG. 5 is a flowchart of an example process for revalidating cached file handles and updating namespace references for an object that has been migrated.

When an access request is received (step 452) at a source partition server for an object that has migrated ("source" object), for example /a/x, the forwarding information at /a/x is returned to the requesting client (step 454). The forwarding information includes the file handle of the object in the new location ("target" object). The client, in response to receiving the new file handle, updates the cached file handle with the new file handle of the migrated object (step 456). The dashed line from step 454 to step 456 signifies a process flow leading to an operation at the client in response to the forwarding information from the partition server of the migrated object. While not shown, it will be appreciated that the client subsequently issues the file access request to the partition server indicated by the new file handle, for example, /a/y.

In addition to sending the forwarding information to the requesting client, a notification is sent to the partition server of the parent object of the migrated source object, specifically, the partition server of /a (step 458). The file handle 400 included in the request to the source partition server includes the information that supports identification of the parent object and owner partition server. The notification indicates that the object /a/x has migrated to /b/y. At the partition server of the parent object, a write lease is obtained on the parent object being updated, and the forward pointer is changed to reference /b/y (step 460). The owner partition server also derives from the request the clients that have cached copies of the parent object and there after invalidates the cached copies. The partition server of the parent object sends an acknowledgment to the partition server of the source object to indicate that the parent partition server has updated its forward pointer. When a partition server receives a request to update a directory entry, it acquires a write lease on the appropriate directory file, invalidates the directory files that are cached at the clients, and then updates the directory entry.

Upon receipt of the acknowledgment from the parent partition server, the partition server of the source object decreases the reference count in the source object (step 464). Until the reference count reaches zero, the partition server of the source object repeats the process (decision step 464) for the migrated object.

When the reference count reaches zero, a timer is started (step 466). As discussed above, the timer is used to limit the duration for which the forwarding information is maintained in the source object. The duration t of the timer is the same as the period used by clients to periodically revalidate cached file handles. After the timer expires for the source object, the source object is returned to the file system free space (step 468).

Conditions relating to the duration for which the source object and forwarding information is maintained are described in the following paragraphs. In order to provide an efficient garbage collection process (destruction of source objects), clients are required to perform periodic revalidation of the cached file handles. That is, a client must revalidate each cached file handle at least every t units of time. By doing so, a partition server that maintains forwarding information for a migrated object is guaranteed that after t time units there are no more file handles cached by clients that reference the source object (condition 1).

The passage of t time units is not a sufficient condition to garbage-collect the forwarding information for the source object. Another necessary condition is that there are no more references in the namespace to the source object (condition 2). This condition is satisfied by counting the references to the source object. In the case of aggressive update of the namespace, condition 2 is satisfied in bounded time. However, in the case of non-aggressive update of the namespace, there is no upper bound for the time required to maintain the forwarding information.

The above two conditions are necessary and sufficient to garbage collect "file" objects. However, conditions 1 and 2 are not sufficient for migrated directories. A third condition that must be satisfied for migrated directories is that the back pointers of the children of that directory must also be updated to point to the new location of the directory before the forwarding information is discarded (condition 3). To achieve this, the reference count of directory objects is extended to reflect not only references from the namespace (by parent directories) but also references from children objects (back pointers). The forwarding information for a migrated directory can be garbage collected when all the above conditions (1, 2 and 3) are satisfied.

Some storage balancing scenarios require measures other than migrating selected sets of objects from one partition server to another. In particular, in some situations it may be desirable to migrate an entire volume. For example, volume migration is typically used when all objects within a volume need to be migrated to improve quality of service or eliminate hot spots. Migrating a volume differs from migrating objects in that with volume-level migration, the ownership of a volume is changed and no data is moved or copied.

Ownership identifies which compute node is responsible for that logical volume. The storage resource could be available on SAN and the resources on the SAN are made available to partition servers via the storage manager. Because all access requests for objects in a logical volume flow through the owner partition server, high access rates to multiple logical volumes that are owned by the same partition server may create performance problems. This type of contention can be addressed by volume-level migration, where ownership of one or more of the volumes is changed.

The volume-level migration process is explained in the following two examples and with the flowchart of FIG. 6. In the first example, working set a.com is contained in logical volumes LV-1 and LV-2, and partition server P1 owns the logical volumes. When a user finds that the objects in LV-1 and LV-2 are contributing to a hot spot, the decision is made to migrate volume LV-1 from partition server P1 ("source" partition server) to partition server P2 ("target" partition server). The migration is accomplished by updating the LV-ID map 124 and establishing forwarding information at P1. The forwarding information directs requesters to P2 and is maintained for a selected period of time. The period of time for which the forwarding information is maintained at the source partition server is the same as the period used by clients to revalidate cached file handles. After the migration of LV-1, access to objects in LV-1 is made through partition server P2, thereby relieving partition server P1 of the load associated with access to objects in LV-1.

In the second example, volume-level migration is used for migrating a "workingset" of objects. Working set migration provides the ability to move a set of files without requiring the input/output intensive object-level migration process. Services hosted in one or more Internet Data Centers (IDC) access objects that are located in logical volumes LV-1, LV-2, and LV-3, which are hosted by partition server P1 which is located in IDC-1. In this scenario, services that are hosted in IDC-2 access the data in LV-1, LV-2, and LV-3. If the system upon which the services run detects that the services are not receiving an expected level of service with respect to access to the data (e.g., bandwidth), migration of a working set of data is initiated. The working set is the data set that services in IDC-2 are accessing. The working set migration is performed by assigning a new logical volume LV-4 to partition server P1 and reassigning the working set from LV-1, LV-2, and LV-3 to LV-4. Once the working set is reassigned to LV-4, ownership of LV-4 is reassigned to a different computing resource, for example partition server P2 in IDC-2. The LV-ID map 124 is updated to reflect the new ownership of LV-4, and subsequent accesses to the working set are directed to via partition server P2 to LV-4 without requiring any changes in the namespace.

Figure 6:
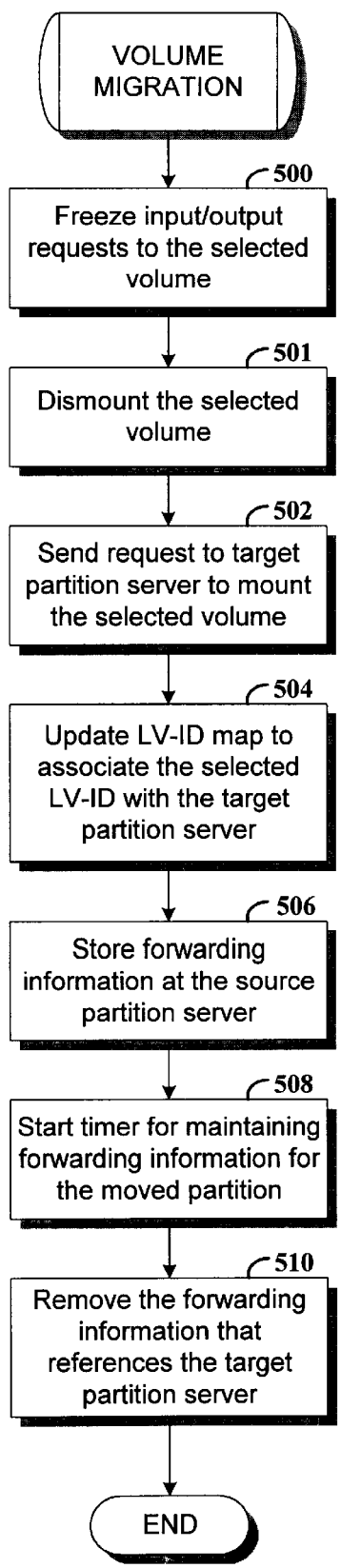
FIG. 6 is a flowchart of an example process for migrating a logical volume from one partition server to another partition server in a distributed file system.

FIG. 6 is a flowchart of an example process for migrating a logical volume from one partition server ("source") to another partition server ("target") in a distributed file system. In migrating a volume, the first step is to freeze further input/output requests to the volume (step 500). In one embodiment, subsequent input/output requests are placed in a pending state and processed after the migration is complete.

In support of recoverability, log entries are written synchronously and atomically to an intention log file (not shown) at each step of the volume migration process. The log entries indicate the beginning and completion of associated steps of the migration process. When the migration is complete, the log entries associated with the migration are deleted from the log file. If either the source or target partition server crashes during a volume migration, the intention log is used in recovery. The recovery actions restore the file system to a consistent state, and the particular recovery actions that are required depend on the point at which the volume migration was interrupted.

After freezing the input/output requests, the volume is dismounted by the source partition server (step 501), and a request is sent to the target partition server to mount the selected volume (step 502). Mounting the volume establishes the binding between the file system and the logical volume.

Upon receiving an acknowledgment from the target partition server, the LV-ID map is updated to associate the selected volume with the selected partition server (step 504). If the source partition server does not receive an acknowledgment from the target partition server, the source partition server initiates recovery actions. The source partition server remounts the file system for the logical volume and releases all pending input/output requests to proceed normally. The source partition server does not send a request to update the mapping of the logical volume to the target partition server. This leaves only the source partition server to provide access to the logical volume. There is a possibility that both the source and target partition servers will have mounted a file system for the same logical volume. To address this situation, the source partition server instructs the target partition server to dismount the file system from the logical volume when the connection between the partition servers is reestablished.

Forwarding information is stored at the source partition server (step 506). The forwarding information identifies the partition server that is the new owner of the migrated logical volume. When the source partition servers receives object access requests for objects in a migrated volume, the forwarding information is used to identify the logical volume containing the referenced object and the target partition server to which the logical volume migrated. The location information that identifies the target partition server is returned to the requesting client, which then submits the request to the target partition server.

After the forwarding information is stored, a timer is started to limit the time during which the forwarding information is maintained (step 508). The duration of the timer is the same as the period in which clients periodically revalidate cached file handles (FIG. 5). When the timer expires, the forwarding information that references the target partition server is removed from the source partition server.

In addition to the example embodiments described above, other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computer-implemented method for migrating a logical volume of objects from a source partition server to a target partition server in a distributed file system having multiple partitions servers, wherein each partition server owns one or more volumes, each volume including a subset of logically related objects of the file system, comprising:

updating, in response to a migration request that requests migration of a selected logical volume from a source partition server to the target partition server, an ownership map to indicate the selected logical volume is owned by the target partition server;

storing at the source partition server forwarding information that references the target partition server; and transmitting the forwarding information to a requester in response to an access request received at the source partition server for an object in the selected logical volume.

2. The method of claim 1, further comprising returning the forwarding information in the source partition server to free space in the file system after a selected period of time.

3. The method of claim 1, further comprising maintaining a centralized ownership map, the centralized ownership map including associations between logical-volume identifiers of logical volumes and the partition servers that own the logical volumes.

4. The method of claim 3, further comprising transmitting the forwarding information to the client in response to an access request received at the source partition server from a client for an object in the selected logical volume.

5. The method of claim 1, further comprising maintaining a distributed ownership map in the partition servers, each partition server having a portion of the ownership map that includes logical-volume identifiers of logical volumes owned by the partition server.

6. The method of claim 5, further comprising transmitting the forwarding information to the client in response to an access request received at the source partition server from a client for an object in the selected logical volume.

7. The method of claim 1, further comprising:

queueing requests for access to objects in the selected volume before updating the ownership map; and transmitting the forwarding information to requesters of the queued requests after the forwarding information has been stored.

8. The method of claim 7, further comprising maintaining a centralized ownership map, the centralized ownership map including associations between logical-volume identifiers of logical volumes and the partition servers that own the logical volumes.

9. The method of claim 8, further comprising transmitting the forwarding information to the client in response to an access request received at the source partition server from a client for an object in the selected logical volume.

10. The method of claim 7, further comprising maintaining a distributed ownership map in the partition servers, each partition server having a portion of the ownership map that includes logical-volume identifiers of logical volumes owned by the partition server.

11. The method of claim 10, further comprising transmitting the forwarding information to the client in response to an access request received at the source partition server from a client for an object in the selected logical volume.

12. An apparatus for migrating a logical volume of objects from a source partition server to a target partition server in a distributed file system having multiple partitions servers, wherein each partition server owns one or more volumes, each volume including a subset of logically related objects of the file system, comprising:

means, responsive to a migration request that requests migration of a selected logical volume from a source partition server to the target partition server, for updating an ownership map to indicate the selected logical volume is owned by the target partition server;

means for storing at the source partition server forwarding information that references the target partition server; and means for transmitting the forwarding information to the client in response to an access request received at the source partition server from a client for an object in the selected logical volume.

13. A computer-readable medium configured with computer program code for migrating a logical volume of objects from a source partition server to a target partition server in a distributed file system having multiple partitions servers, wherein each partition server owns one or more volumes, each volume including a subset of logically related objects of the file system, the computer program code configured to cause a computer to perform the steps comprising:

updating, in response to a migration request that requests migration of a selected logical volume from a source partition server to the target partition server, an ownership map to indicate the selected logical volume is owned by the target partition server;

storing at the source partition server forwarding information that references the target partition server; and transmitting the forwarding information to the client in response to an access request received at the source partition server from a client for an object in the selected logical volume.

14. A distributed file management system, comprising:

a plurality of partition servers configured for ownership of a set of logical volumes of logically related file system objects, each partition server configured to control access to the set of logical volumes owned by the partition server;

an ownership map coupled to the plurality of partition servers, the ownership map indicating which partition servers own which logical volumes; and wherein each partition server is adapted to migrate a selected logical volume from a source partition server to a target partition server in response to a migration request.

15. The system of claim 14, wherein each partition server is configured to store, in response to being the source partition server in the migration request, forwarding information that references the target partition server, and transmit the forwarding information to requesters that reference objects of the selected logical volume.

16. The system of claim 14, further comprising a storage manager coupled to the partition servers, the storage manager configured to maintain a the ownership map that includes associations between logical-volume identifiers of logical volumes and the partition servers that own the logical volumes.

17. The system of claim 14, wherein each partition server maintains a portion of the ownership map that includes logical-volume identifiers of logical volumes owned by the partition server.

* * * * *